US007424525B2

(12) United States Patent
Guarraci et al.

(10) Patent No.: US 7,424,525 B2
(45) Date of Patent: Sep. 9, 2008

(54) MANAGING HEADLESS COMPUTER SYSTEMS

(75) Inventors: Brian J. Guarraci, Redmond, WA (US); Andrew J. Ritz, Sammamish, WA (US); Pasquale DeMaio, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 10/609,932

(22) Filed: Jun. 30, 2003

(65) Prior Publication Data

US 2004/0267918 A1 Dec. 30, 2004

(51) Int. Cl.
*G06F 15/173* (2006.01)
*G06F 15/16* (2006.01)
*G06F 11/00* (2006.01)

(52) U.S. Cl. .................. 709/223; 709/217; 709/227; 714/3

(58) Field of Classification Search ......... 709/217–219, 709/223–229; 714/1–4
See application file for complete search history.

(56) References Cited

U.S. PATENT DOCUMENTS

| 4,811,284 | A | 3/1989 | Adler et al. ............... 364/900 |
| 5,072,370 | A | 12/1991 | Durdik .................... 395/575 |
| 5,307,354 | A | 4/1994 | Cramer et al. ............ 371/11.2 |
| 5,491,791 | A | 2/1996 | Glowny et al. ......... 395/183.13 |
| 6,138,150 | A | 10/2000 | Nichols et al. ............. 709/219 |
| 6,286,003 | B1 | 9/2001 | Muta ........................ 707/10 |
| 6,295,527 | B1 * | 9/2001 | McCormack et al. .......... 707/3 |
| 6,415,324 | B1 | 7/2002 | Cromer et al. ............. 709/229 |
| 6,466,971 | B1 * | 10/2002 | Humpleman et al. ........ 709/220 |
| 6,557,120 | B1 | 4/2003 | Nicholson et al. ........... 714/38 |
| 6,792,505 | B2 * | 9/2004 | Otterness et al. ............ 711/114 |
| 6,868,447 | B1 * | 3/2005 | Slaughter et al. ............ 709/225 |
| 7,058,826 | B2 * | 6/2006 | Fung .......................... 713/300 |
| 7,065,574 | B1 * | 6/2006 | Saulpaugh et al. .......... 709/225 |
| 7,137,042 | B2 * | 11/2006 | Fujibayashi ................. 714/47 |
| 7,185,136 | B2 * | 2/2007 | Zarns ........................ 710/315 |
| 7,216,188 | B2 * | 5/2007 | Reid et al. .................... 710/74 |
| 2002/0116485 | A1 * | 8/2002 | Black et al. ................ 709/223 |
| 2002/0169825 | A1 * | 11/2002 | Hougland et al. ........... 709/203 |
| 2003/0004976 | A1 * | 1/2003 | Enokida et al. ............. 707/200 |
| 2003/0028577 | A1 * | 2/2003 | Dorland et al. ............. 709/100 |

(Continued)

OTHER PUBLICATIONS

Muller, Nathan J., Focus on OpenView, CBM Books, 1995.*

(Continued)

*Primary Examiner*—Joseph E Avellino
(74) *Attorney, Agent, or Firm*—Workman Nydegger

(57) ABSTRACT

Methods, systems, and computer program products for remotely monitoring diverse computer systems in a similar manner over an out-of-band communication channel. Remote monitoring ordinarily is performed over an in-band communication channel. However, hardware and/or software problems may make the in-band communication channel unavailable for a time. While the in-band communication channel is unavailable, the management computer receives status information over the out-of-band communication channel. Based on received status information, the management computer identifies actions to take, such as controlling processes or otherwise configuring the remote computer system, and communicates the actions to the remote computer system over the out-of-band communication channel. The management computer is capable of communicating with any of several diverse computers and exchanges data in a format that is independent of any particular computer system. The format also separates status information from placement information used to display the status information, and may conform to an XML schema.

38 Claims, 5 Drawing Sheets

U.S. PATENT DOCUMENTS

| | | | |
|---|---|---|---|
| 2003/0046238 A1* | 3/2003 | Nonaka et al. | 705/51 |
| 2003/0088727 A1* | 5/2003 | Zarns | 710/313 |
| 2003/0163582 A1* | 8/2003 | Inoue et al. | 709/238 |
| 2003/0204377 A1* | 10/2003 | Royal et al. | 702/188 |
| 2003/0229696 A1* | 12/2003 | Klein et al. | 709/224 |
| 2004/0024868 A1* | 2/2004 | Drummond | 709/224 |
| 2004/0034704 A1* | 2/2004 | Connelly | 709/224 |
| 2004/0046970 A1* | 3/2004 | Miyachi | 358/1.1 |
| 2004/0111670 A1* | 6/2004 | Sasakuma et al. | 715/513 |
| 2004/0122940 A1* | 6/2004 | Gibson et al. | 709/224 |
| 2004/0123090 A1* | 6/2004 | Zimmer et al. | 713/1 |
| 2004/0148611 A1* | 7/2004 | Manion et al. | 719/328 |
| 2004/0255014 A1* | 12/2004 | Motoyama et al. | 709/223 |
| 2005/0021686 A1* | 1/2005 | Jai et al. | 709/220 |
| 2005/0210176 A1* | 9/2005 | Zarns | 710/315 |
| 2006/0112175 A1* | 5/2006 | Sellers et al. | 709/223 |
| 2006/0168229 A1* | 7/2006 | Shim et al. | 709/226 |
| 2007/0222862 A1* | 9/2007 | Endo et al. | 348/207.2 |

OTHER PUBLICATIONS

Zong, B.Q.; Su Jiang; Tao Zhong; Hui Dong; Shuangli Zhong; Weiming Zhou; and Sansheng Chen; "Network Management Convergence of Multiple Sub-Networks in GSM Infrastructure"; Proceedings of the SPIE—The International Society for Optical Engineering; Nov. 13-15, 2001; vol. 4584; p. 206-14.

Sebastine, Seejo; Kyoung-Don Kang; Abdelzaher, Tarek F.; and Son, Sang H.; "A Scalable Web-Based Real-Time Information Distribution Service for Industrial Applications"; IECON'01 27th Annual Conference of the IEEE Industrial Electronics Society; (Cat. No. 37243); Nov. 29-Dec. 2, 2001; vol. 3; p. 1810-15.

Siyi Zou; Guangchun Zhang; and Guangning Wu; "The Application of Embedded Real-Time Linux on Intelligent Insulation On-Line Monitoring"; Proceedings of 2001 International Symposium on Electrical Insulating Materials (ISEIM 2001), 2001 Asian Conference on Electrical Insulatiing Diagnosis (ACEID 2001), and 33rd Symposium on Electrical Insulating Materials and Applications in Systems; (IEEE Cat. No. 01TH8544); Nov. 19-22, 2001; p. 201-4.

Webb, Warren; "Directing Distant Devices"; *EDN (US Edition)*; Feb. 15, 2001; vol. 46, No. 4; p. 53-60.

Hwa-Chun Lin and Chien-Hsing Wang; "Distributed Network Management by HTTP-Based Remote Invocation"; Seamless Interconnection for Universal Services Global Telecommnications Conference (GLOBECOM'99); (Cat. No. 99CH37042); Dec. 5-9, 1999; vol. 3; p. 1889-93.

Nieva, Txomin; "Automatic Configuration for Remote Diagnosis and Monitoring of Railway Equipments"; Proceedings of the Seventeenth IASTED International Conference of Applied Informatics; Feb. 15-18, 1999; p. 93-7.

Barrett, Robert J.; "Network Management Fit to Beat the Band"; *Communications*; Dec. 1983; vol. 6, No. 12; p. 35-6, 40-4, and 49.

Webb, Warren; "Bladerunners: Serving Remote Data"; *EDN (US Edition)*; Sep. 26, 2002; vol. 47, No. 21; p. 57-62.

* cited by examiner

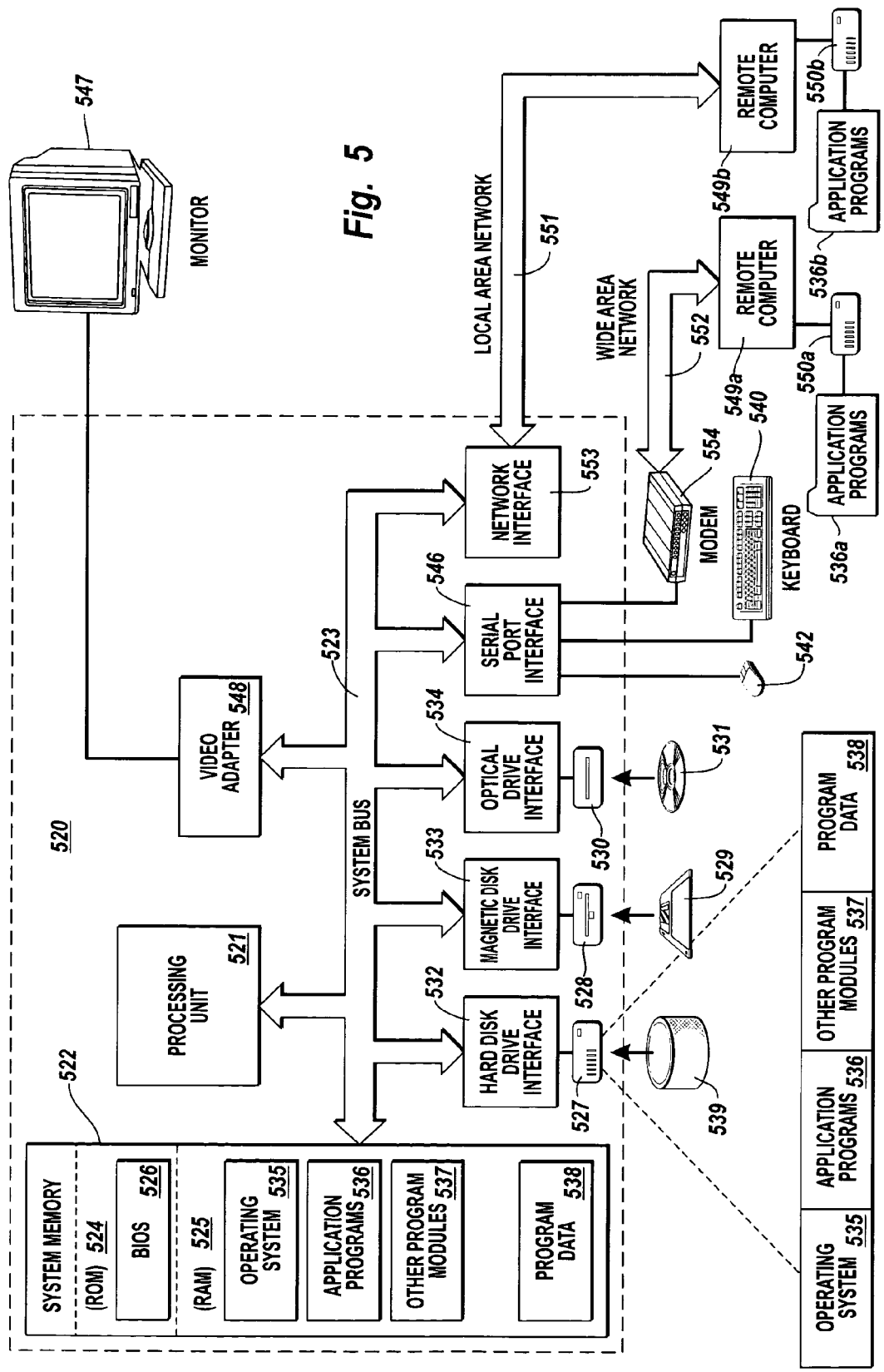

MANAGING HEADLESS COMPUTER SYSTEMS

CROSS-REFERENCE TO RELATED APPLICATIONS

N/A

BACKGROUND OF THE INVENTION

1. The Field of the Invention

The present invention relates to remote monitoring of computer systems. More particularly, the present invention relates to methods, systems, and computer program products for remotely monitoring diverse computer systems in a similar manner, over an out-of-band communication channel.

2. Background and Related Art

Remote monitoring of computer systems is desirable for a variety of reasons, including centralization of support personnel, enhanced access to computer systems that are difficult to reach physically, and to reduce space requirements and expenses by allowing for headless systems. For example, computer systems may be located under ground, in cramped closets, on towers or poles, or at distant locations; computer systems may be more densely placed in racks of servers if monitors, video cards, keyboard, mouse, etc. are eliminated; and even for relatively small organizations, certain support functions may be more efficiently performed if support personnel are not required to move from one physical location to another.

Remote computer systems often include an in-band communication channel for monitoring the computer system and an out-of-band communication channel for use when the in-band communication channel is unavailable, such as from a hardware or software problem or because the computer system is booting. The in-band communication channel is typically a network connection using standard management protocols, such as Simple Network Management Protocol ("SNMP"), in the monitoring process. From the perspective of a user managing the remote computer system, the in-band connection almost makes it appear as if the user were managing a local computer system.

In many circumstances, however, using standard management protocols over in-band communication channels offers a somewhat inflexible monitoring solution. For example, standard management protocols tend to impose rigid format requirements that limit backwards compatibility when the protocols are extended. As a result, managing heterogeneous remote systems may prove difficult or impossible. Standard management protocols also tend to be limited in their ability to communicate complete and/or complex state information. For example, standard management protocols usually communicate only discrete changes in state information, as opposed to a complete representation of current state information. Accordingly, unless a monitoring system tracks each and every discrete change, it may be difficult to obtain an accurate picture of a remote system's current state.

Another problem with standard management protocols is the close coupling required between the remote system and the monitoring system. Monitoring systems generally must be configured to understand and interpret the data sent by a remote system, so that when data is received from a remote system, the monitoring system can first know what the data means, and second take an appropriate action. When taking an appropriate action, standard management protocols usually do not send commands to be executed at a remote computer system, but rather are able to control the remote computer system through manipulation of the relevant data structures. It should also be noted that standard management protocols typically favor a particular transport, and therefore may be limited to networks where the particular transport is supported and available.

Due to the sophistication of in-band communication channels, however, they generally are available only after a remote system has booted its operating system, and are vulnerable to a variety of software and hardware problems. To account for unavailability of the in-band communication channel, remote computer systems typically have an out-of-band communication channel that supports more limited monitoring capabilities. The out-of-band communication channel often is implemented as a serial channel that supports simple terminal emulation. Unlike standardized in-band communication channels, however, out-of-band communication channels usually supply information in a system specific format, which makes monitoring diverse remote computer systems difficult. For example, when using an out-of-band communication channel, the commands used to query, control, and/or configure a remote computer system and the remote system's responses tend to vary from one computer system to another. In some implementations, out-of-band communication is tied to specific information appearing at specific screen positions.

Accordingly, management computers for diverse remote computer systems usually maintain a fair amount of software for interacting with the out-of-band communication channels for the various remote computer systems being monitored. Because differences in computer systems are frequently manifested in traditional out-of-band communication channels, remote management generally requires a significant amount of human interaction, and in many circumstances, automated monitoring simply is not practical. Furthermore, even where similar computer systems are monitored, hardware and software upgrades to remote systems are likely to impact conventional out-of-band communication channels and require some level of corresponding changes at the management computer system. Therefore, methods, systems, and computer program products for remotely monitoring diverse computer systems in a similar manner, over an out-of-band communication channel are desired.

BRIEF SUMMARY OF THE INVENTION

The present invention relates to methods, systems, and computer program products for remotely monitoring diverse computer systems in a similar manner over an out-of-band communication channel. In accordance with example embodiments, a management computer system is capable of communicating with any of several diverse computer systems. Ordinarily, remote monitoring for these diverse computer systems is performed over an in-band communication channel, but hardware and/or software problems may make the in-band communication channel unavailable for a period of time.

When the in-band communication channel is unavailable, the management computer system receives status information over an out-of-band communication channel of the remote computer system in a format that is independent of any particular computer system and that separates the status information from presentation or placement information used to display the status information. Based on the received status information, the management computer system identifies actions to take, such as actions for controlling processes or otherwise configuring the remote computer system. Once identified, the management computer system communicates the actions to the remote computer system over the out-ofband communication channel in a format that is independent of any particular computer system. For example, communicated actions, as well as received status information, may conform to one or more eXtensible Markup Language schemas.

The status information may be received from the remote computer system without having been previously requested or may be received in response to a request by the management computer system. For example, a remote computer system may send certain status information over the out-of-band communication channel as an indication of an approaching problem or simply to report current operating conditions. The management computer system may request additional status information based on status information already received or may request status information in an effort to diagnose an existing problem.

Remote monitoring at the management computer system may be conducted through an interactive monitoring application and corresponding user interface, may involve one or more automated monitoring applications, or may include a combination of automated and interactive monitoring. Each diverse computer system may use a variety of hardware to support remote monitoring, including a service processor capable of operating without the headless computer system's operating system and an uninterruptible power supply that can be used to cycle power at the remote computer system.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 5 illustrates an example system that provides a suitable operating environment for practicing the present invention.

DETAILED DESCRIPTION OF THE PREFERRED EMBODIMENTS

The present invention extends to methods, systems, and computer program products for remotely monitoring diverse computer systems, in a similar manner, over an out-of-band communication channel. It should be appreciated that remote simply indicates the use of one computer system by another, and does not necessarily imply separation by a significant distance. The embodiments of the present invention may comprise one or more special purpose and/or one or more general purpose computers including various computer hardware and software, as discussed in greater detail below.

Figure 1:
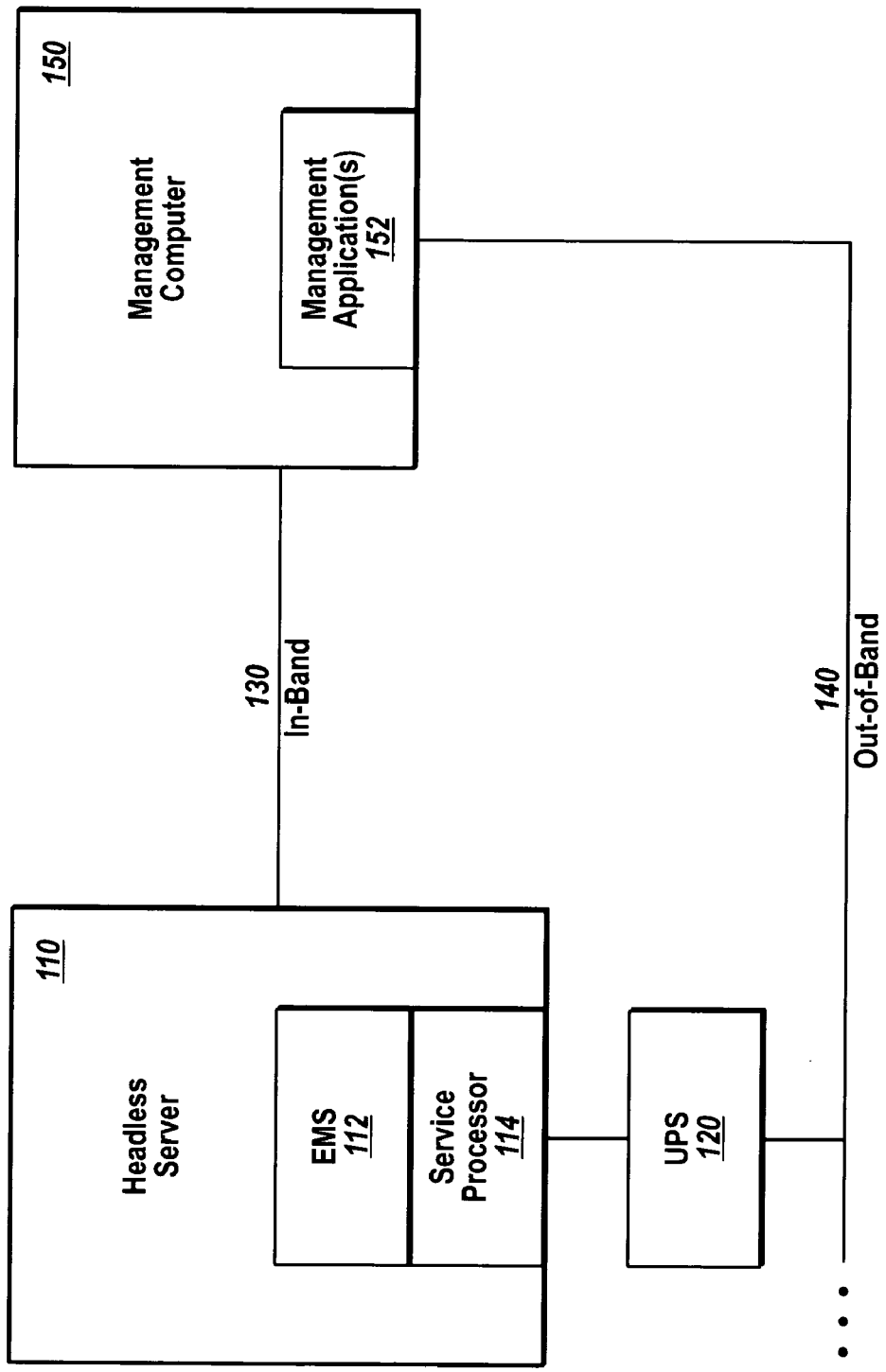
FIG. 1 illustrates an example environment for practicing the present invention.

FIG. 1 illustrates an example remote monitoring environment for practicing the present invention. Headless server 110 is a remote computer system that is monitored by management computer 150 over in-band communication channel 130. Headless servers, such as headless server 110 are common in a variety of circumstances where little or no need exists for a monitor, video, keyboard, mouse, etc. For example, headless server 110 may be located under ground, in a cramped closet, within a rack of multiple computer systems, on a tower or pole, or at a distant location. Because in most cases no one is physically present, headless server 110 eliminates unnecessary input/output components to reduce costs, reduce space requirements (and allow for increased computer density), reduce power consumption, and secure the other benefits that headless computer systems offer.

As indicated above, communication between headless server 110 and management computer 150 ordinarily occurs over in-band communication channel 130. Typically, the in-band communication channel 130 is a network connection that uses standard management protocols in the monitoring process for exchanging status information and commands. For a user at management computer 150, managing headless server 110 over in-band communication channel 130 is similar to managing a local computer system. However, the relative sophistication of the in-band communication channel 130 makes it vulnerable to hardware and software problems, and in-band communication channel 130 is not available while headless server 110 boots. If headless server 110 were experiencing a boot problem, therefore, in-band communication channel 130 would be of little or no assistance.

Headless server 110 also includes an out-of-band communication channel 140 for use when in-band communication channel 130 is unavailable. As noted above, traditional out-of-band communication channels often have been implemented as serial channels that support simple terminal emulation. Traditional out-of-band communication channels usually have exchanged information in a system specific format and mixed the information with presentation data for displaying the information. Some traditional systems have used binary formats for status information and commands or requests. Accordingly, monitoring diverse remote computer systems, using a conventional out-of-band communication channel has been impractical, if not impossible, in many circumstances. Even monitoring a single remote computer system can prove difficult due to software and hardware upgrades that may impact system specific data exchange formats, such as formats depending on information appearing at particular screen locations or formats tied to specific hardware or software at the remote computer system.

In contrast to conventional out-of-band communication channels, out-of-band communication channel 140 exchanges data in a format that is independent of any particular remote headless system being monitored. For example, status information received from and commands or requests sent to headless server 110 may be in a format that conforms to an eXtensible Markup Language (XML) schema. XML is advantageous because in addition to allowing for standardization, XML also is self-describing and extensible. Note that even though XML may be encoded into a binary representation, the underlying format itself is text- or string-based, and therefore relatively easily extended. Nevertheless, the present invention is not necessarily limited to any particular data format.

Exchanging data in a format that is not specific to any particular remote headless computer system makes it practical for management computer 150 to monitor diverse computer systems (as suggested by the ellipses following out-of-band communication channel 140). Exchanging data in a format that is not specific to any particular remote headless computer system also makes it practical for management computer 150 to implement automated monitoring as described in greater detail below in connection with FIG. 3. A diverse computer system may be one that changes over time, due to hardware or software upgrades, or may be one of multiple computer systems that are not identical. For diverse computer systems, while the actual commands, responses, and requests used in monitoring may vary over time or from one remote headless server to another, the format of data exchanged over out-of-band communication channel 140 remains independent of the particular remote server being monitored.

Consider, for example, setting the date/time at headless server 110. Headless server 110 may implement specific operations for reporting and changing the current date/time in a way that is idiosyncratic to headless server 110 (and potentially other computer systems like headless server 110). Rather than keep track of such idiosyncrasies, management computer 150 and headless server 110 exchange date/time commands and status information over out-of-band communication channel 140 in a generic format that is independent of headless server 110. When sending or receiving date/time monitoring data, headless server 110 accounts for these idiosyncrasies, as appropriate, for example, by converting a generic data/time command to the equivalent idiosyncratic operation implemented at headless server 110 or by converting idiosyncratic data/time status information to the generic format. Of course, not all idiosyncrasies need be eliminated. The data format itself may provide for exchanging both standardized and idiosyncratic data.

In one example embodiment, formatting data so that it is not specific to any particular remote headless computer system is performed by emergency management services (EMS) 112 at headless server 110 and by management applications 152 at management computer 150. EMS 112 is a collection of components that allow their output to be redirected to an out-of-band management channel (and to a video card if one is present). For example, the components may include a setup loader component, a setup component, a recovery component, a remote installation component, an operating system loader component, and a stop error message component. To use EMS 112, however, the operating system loader or kernel must be at least partially functioning.

Among other things, EMS 112 allows for restarting or shutting down headless server 110, viewing a list of processes or threads that are currently active, ending processes, raising or lowering the priority of a process or thread, ending processes, setting or viewing the Internet Protocol (IP) address of headless server 110, displaying identification information for headless server 110, limiting the memory usage of a process, setting the date/time at headless server 110, generating a stop error and creating a memory dump file, starting and accessing command prompts (e.g., console-based command shells), etc. Generally, EMS 112 correlates to command-based (e.g., console) functionality provided by headless server 110.

Management applications 152 at management computer 150 monitor headless server 110 using out-of-band communication channel 140. This includes receiving status information from headless server 110 and sending commands, such as those identified above, to headless server 110. As described in greater detail below with respect to FIG. 3, monitoring may involve, for example, a user activity requesting status information from headless server 110 and then taking actions based on the received status information; automated management software that uses rules to identify actions that should be taken based on the received status information; or a combination of user and automated monitoring software.

Using a generic data format or representation, such as XML, that it is not specific to any particular remote headless computer system, also helps reduce the significance of the actual transport mechanism used for out-of-band communication channel 140. Accordingly, the out-of-band communication channel 140 may be implemented using a wide variety of hardware and software including a standard serial Universal Asynchronous Receiver/Transmitter (UART), a Universal Serial Bus (USB) connection, a modem connection, an Ethernet connection, a Transmission Control Protocol/Internet Protocol (TCP/IP) network layer, Telnet, HyperText Transfer Protocol (HTTP), Simple Object Access Protocol (SOAP), and the like. In contrast, reliance on terminal emulation in conventional out-of-band communication channels typically limited the channels to serial UART implementations.

Unlike EMS 112, a service processor, such as service processor 114, is designed to function without using the operating system or CPU of headless server 110. Therefore, when a severe system problem causes headless server 110 to stop responding, management computer 150 may monitor headless server 110 using service processor 114. Typically, service processor 114 is integrated onto the system motherboard of headless server 110 or as a Peripheral Component Interconnect (PCI) adapter. Service processor 114 may be implemented as an Application Specific Integrated Circuit (ASIC) that uses its own firmware, and may have a separate power supply for enhanced reliability. Service processor 114 supports the following functionality: turn headless server 110 on/off, reset headless server 110, provide access to EMS 112, console redirection, etc.

Management computer 150 communicates directly with service processor 114 through out-of-band communication channel 140. It should be noted here that out-of-band communication channel 140 may be implemented as one or more out-of-band communication channels. Accordingly, a single combined channel may be used for communication with service processor 114 and EMS 112, or separate (perhaps multiple for each) channels may be used. For example, service processor 114 may provide a pass through connection between management computer 150 and the operating system at headless server 110 to allow for a single out-of-band communication channel 140. As noted above, out-of-band communication channel 140 may be implemented using a wide variety of hardware and software, including a standard serial UART, a USB connection, a modem connection, an Ethernet connection, a TCP/IP network layer, Telnet, HTTP, SOAP, and so forth.

Uninterruptible power supply (UPS) 120 controls the power that is supplied to headless server 110. Therefore, UPS 120 may provide basic remote management capabilities, such as the ability to cycle power or reset headless server 110. Like server processor 114, UPS 120 may allow communication from management computer 150 over out-of-band communication channel 140 to pass through it and reach headless server 110. For example, out of band communication channel 140 may include a port on management computer 150 that is used for monitoring remote systems, connected to a similar port on UPS 120, which in turn is connected to a similar port on headless server 110.

Figure 2:
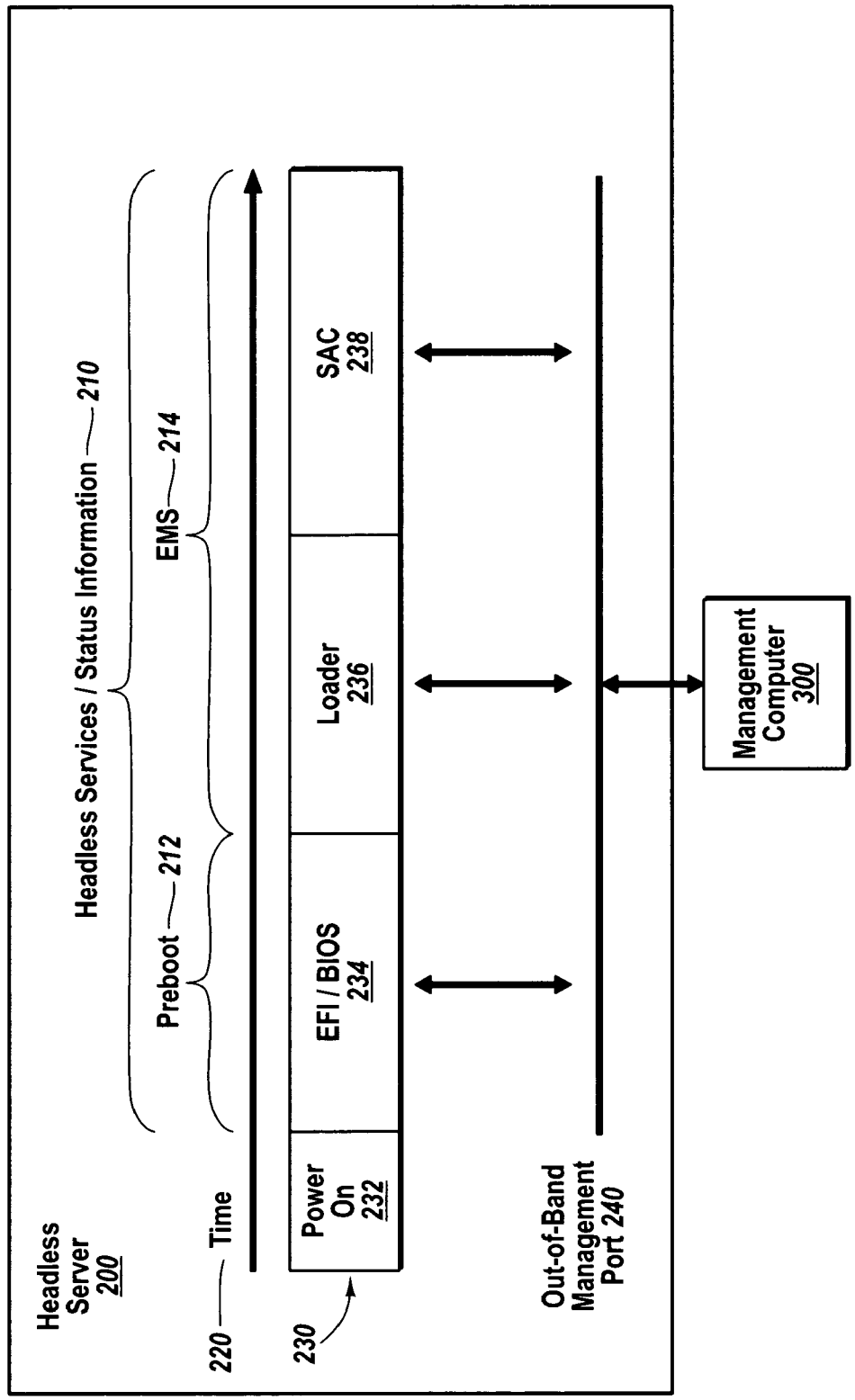
FIG. 2 shows example machine states for a headless server being monitored by a management computer.

FIG. 2 shows example machine states 230 for a headless server 200 that is being monitored using out-of-band management port 240 by management computer 300. The monitoring data and commands available at headless server 200 vary over time 220 based on the computer's current machine state 230 as well as the system's hardware and software configuration. For example, at power on 232 certain process operations would not be available, such as listing current processes or threads, etc. Current machine state 230 is one example of status information that may be sent to management computer 300 without management computer 300 first requesting the status information.

In FIG. 2, time 220 is divided in preboot 212 and EMS 214. During preboot 212, monitoring may be limited to Extensible Firmware Interface (EFI) or Basic Input/Output System (234) routines. Once the operating system loader 236 starts, EMS 214 components become available for monitoring purposes. Then, after the operating system loads, a special administration console (SAC) 238 command line environment for EMS 214 starts. Although the monitoring that is available at headless server 220 varies over the machine states 230, headless services/status information 210 covers all machine states. In other words, management computer 300 uses a single communication mechanism over out-of-band management port 240 for monitoring headless server 200, and that communication mechanism or model is available across all machine states.

Figure 3:
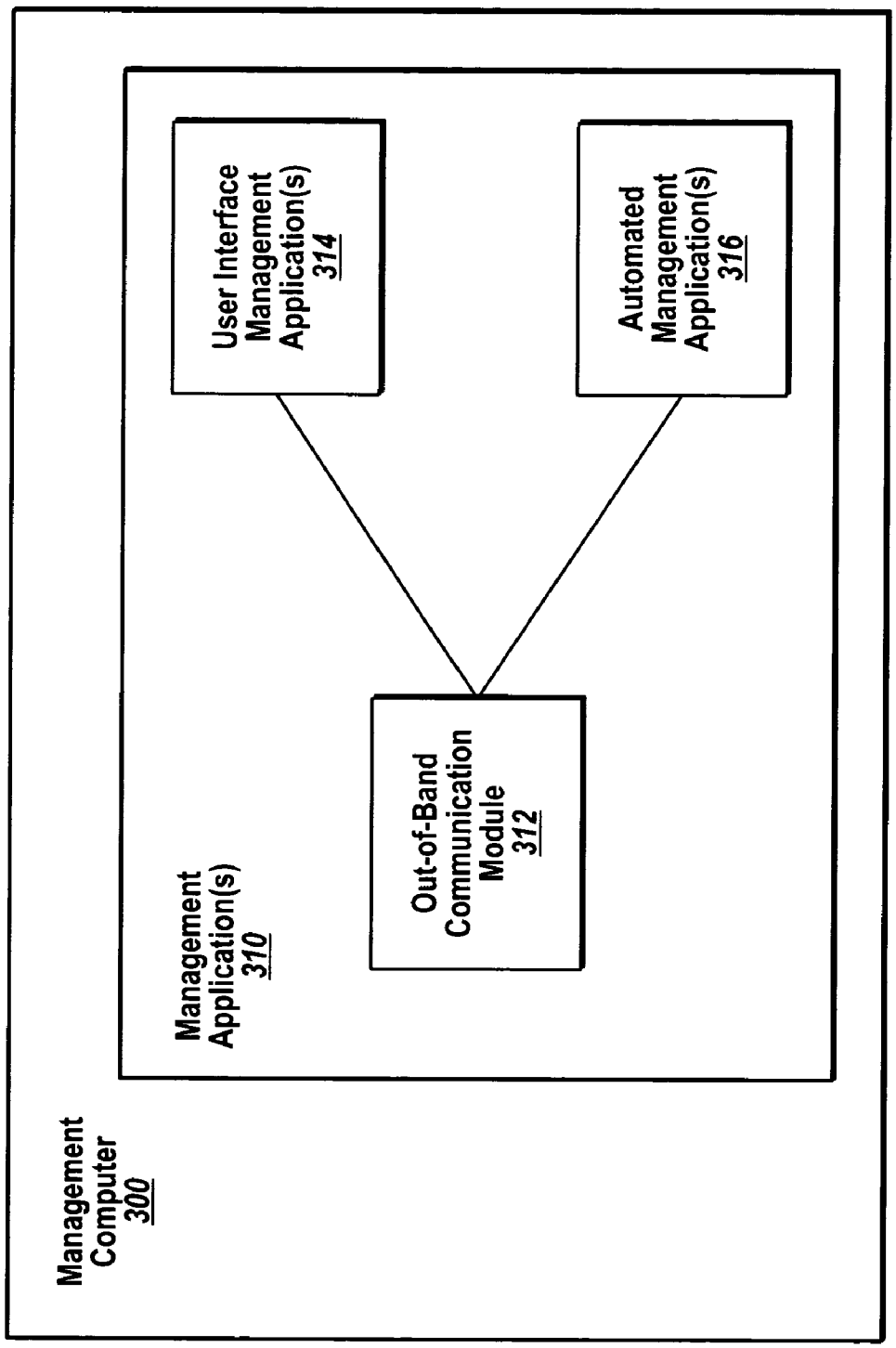
FIG. 3 illustrates an example management computer for monitoring a headless computer system in accordance with the present invention.

FIG. 3 illustrates an example management computer 300 for monitoring a headless computer system in accordance with the present invention. Management applications 310 include an out-of-band communication module 312 for exchanging data over an out-of-band communication channel that links management computer 300 with one or more diverse computer system being monitored. As described above, unlike conventional monitoring, when management applications 310 monitor in accordance with example embodiments of the present invention, presentation or placement information is separated from the monitoring data.

Out-of-band communication module 312 is responsible for interfacing with the out-of-band communication channel. For example, with respect to the computer system being monitored, out-of-band communication module 312: (i) sends requests for status information, (ii) receives status information, and (iii) sends commands. Again, requests, received status information, and commands are all exchanged in a format that is independent of the computer system being monitored. Monitoring a remote computer system in accordance with example embodiments of the present invention may include periodic checks to verify acceptable system performance and operation, or may be in response to a perceived or actual problem at the remote computer system and aimed at diagnosing and remedying the problem.

By exchanging data in a format that is independent of the computer system being monitored, out-of-band communication module 312 may serve a wide variety of monitoring applications. Whereas conventional out-of-band monitoring involved poorly defined data sets (ones that changed from one computer to another and/or over time) that were difficult to parse because the monitoring data was combined with physical placement information, monitoring in accordance with example embodiments of the present invention separates the monitoring data from the placement information. As a result, example embodiments of the present invention simplify the development of management applications that vary or customize presentation of the monitoring data.

User interface management applications 314 represent interactive monitoring applications. With user interface management applications 314, a user is able to review received status information, request additional status information, and send commands to the remote system being monitored. In an example embodiment where status information conforms to an XML schema, user interface management applications 314 may be implemented as a browser that renders the received XML into a custom user interface. Because XML separates presentation of the monitoring data from the monitoring data itself, user interface management applications 314 offer enhanced flexibility in presenting the monitoring data to a user.

Automated management applications 316 represent automated monitoring applications. As indicated above, by exchanging data in a format that is independent of the computer system being monitored, out-of-band communication module 312 may serve a wide variety of monitoring applications. Automated management applications 316 may include a variety of rules that identify actions to take. For example, the priority of processes or threads at a remote computer system may be adjusted or memory limits may be established for a process to enhance system performance or in response to a boot failure, the automated management application 316 may attempt to restart the remote system.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 4:
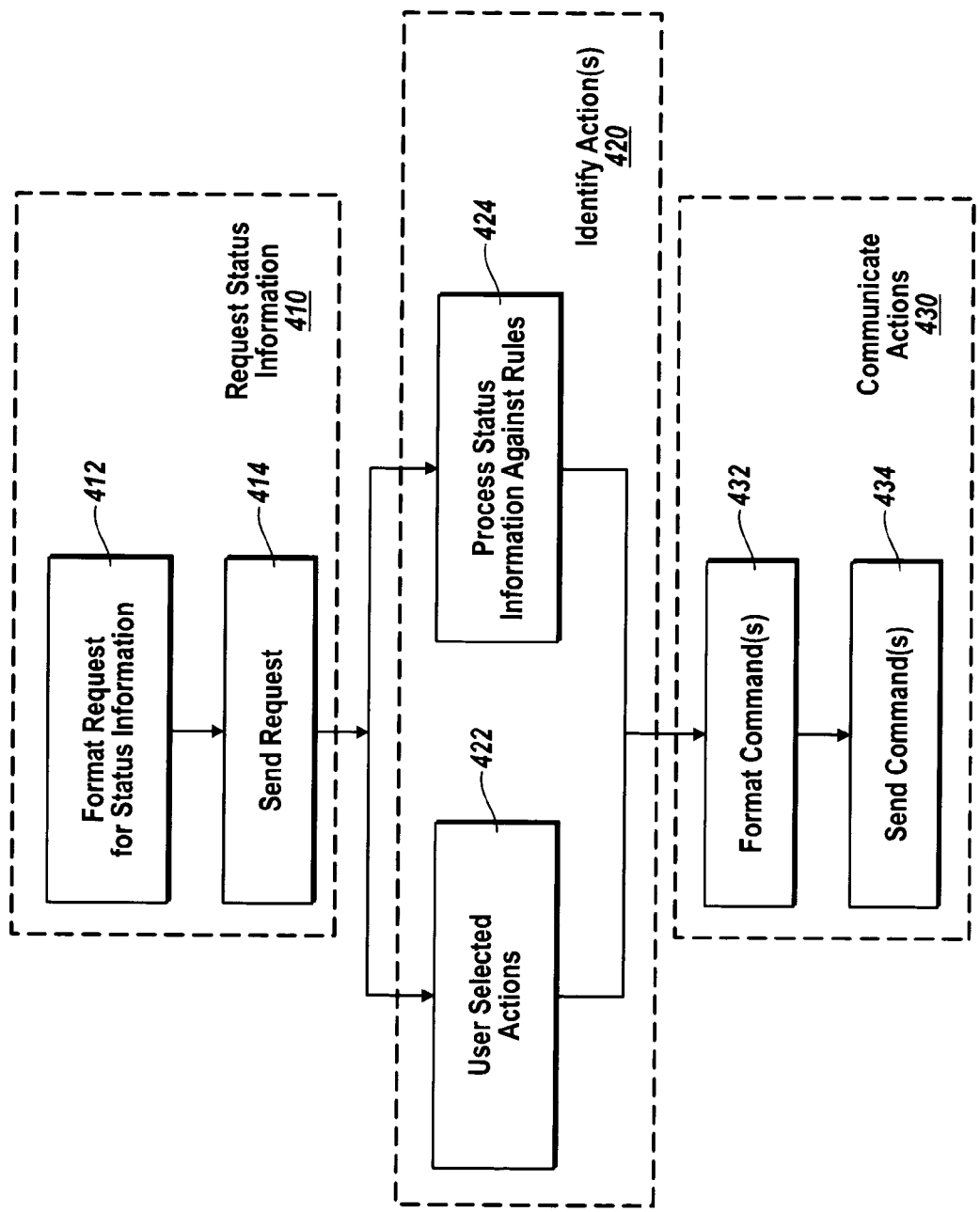
FIG. 4 shows example acts and steps for methods of remotely monitoring diverse computer systems in accordance with the present invention.

FIG. 4 shows example acts and steps for methods of remotely monitoring diverse computer systems in accordance with the present invention. A step for requesting (410) status information from one or more diverse computer systems may include an act of formatting (412) the request for status information in a format that is independent of the one or more diverse computer systems and an act of sending (414) the request to the one or more diverse computer systems using an out-of-band communication channel. A step for identifying (420) one or more actions to take based on status information that is received from one or more diverse headless computer systems may include an act of a user selecting or identifying (422) the one or more actions through a management application with a user interface and/or an act of processing (424) the received status information against one or more rules within an automated management application. As indicated above, status information may be received from the one or more diverse computer systems without having been first requested.

A step for communicating (430) one or more identified actions to the one or more diverse computer systems may include an act of formatting (432) one or more commands in a format that is independent of the one or more diverse computer systems and an act of sending (434) the one or more commands to the one or more diverse computer systems over an out-of-band communication channel. Example actions include commands to monitor processes, such as by altering process priority, and commands to configuration of the one or more diverse computer systems. As described above, the format for the received status information and for the commands may conform to an XML schema. Some monitored diverse computer systems may include an uninterruptible power supply with a communication port and a service processor that is capable of functioning with the computer system's operation system.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 539, magnetic disk 529, optical disc 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers. Of course, as indicated above, a headless computer system may omit certain input/output hardware, such as monitor 547, video adapter 548, keyboard 540, pointing device 542, etc. to reduce costs, reduce space requirements (and allow for increased computer density), reduce power consumption, and the like. It also should be noted that the hardware and software of a diverse computer system is subject to change over time or from one diverse system to another. Accordingly, computer 520 merely represents one example of a computer system suitable for use as a management computer system or a remote computer system to be monitored.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a management computer system capable of communicating with a plurality of diverse headless computer systems, each comprising at least one sophisticated in-band communication channel for monitoring operation of the corresponding headless computer system and at least one unsophisticated out-of-band communication channel, wherein a sophisticated communication channel is a network type connection and wherein an unsophisticated communication channel is one that is independent of a transport mechanism and that does not require the corresponding headless computer system or network to be in an operational state, a method of remotely monitoring one or more diverse headless computer systems, over one or more unsophisticated corresponding out-of-band communication channels that allows each of the one or more diverse headless computer systems to be monitored in a similar manner, the method comprising acts of:
   receiving status information over the one or more diverse headless computer systems' corresponding one or more unsophisticated out-of-band communication channels in an extensible, self-describing status format that (i) is independent of the one or more diverse headless computer systems and (ii) separates the status information from physical placement information for displaying the status information;
   processing the status information against one or more rules to identify one or more commands to issue in response to the status information;
   formatting the one or more commands in an extensible, self-describing command format that is independent of the one or more diverse headless computer systems; and
   sending the one or more commands to be remotely executed at the one or more diverse headless computer systems using the one or more diverse headless computer systems' corresponding one or more unsophisticated out-of-band communication channels.

2. A method as recited in claim 1, further comprising acts of:
   formatting a request for the status information in an extensible, self-describing request format that is independent of the one or more diverse headless computer systems; and
   sending the request to the one or more diverse headless computer systems using the one or more unsophisticated out-of-band communication channels for the one or more diverse headless computer systems.

3. A method as recited in claim 1, wherein the one or more diverse headless computer systems' corresponding one or more in-band communication channels are unavailable because the one or more diverse headless computer systems are booting.

4. A method as recited in claim 1, wherein the one or more diverse headless computer systems' corresponding one or more in-band communication channels are unavailable due to a hardware or software malfunction at the one or more diverse headless computer systems.

5. A method as recited in claim 1, wherein the extensible, self-describing status format and the extensible command format conform to one or more eXtensible Markup Language schemas.

6. A method as recited in claim 1, wherein the status information is received by a management computer system without having been requested.

7. A method as recited in claim 1, wherein the one or more commands comprise at least one of a restart command, a shut down command, an identification information command, a list processes command, an end process command, a process priority command, a limit memory usage command, a create memory dump command, a view Internet Protocol address command, a set Internet Protocol address command, a view date/time command, a set date/time command, a command to manage an out-of-band communication channel, and a command to access a command shell.

8. A method as recited in claim 7, wherein the one or more rules are part of one or more automated management applications.

9. A method as recited in claim 1, wherein each of the one or more diverse headless computer systems comprises an operating system and a service processor communicating directly with a management computing system over the unsophisticated out-of-band communication channel using the extensible, self-describing command format and wherein the service processor provides a pass through connection between the management computer and the operating system when the operating system is in an operational state and the service processor is capable of functioning without the operating system when the operating system is in an inoperable state.

10. A method as recited in claim 1, wherein the one or more unsophisticated out-of-band communication channels for the one or more diverse headless computer systems comprise a communication port of an uninterruptable power supply wherein the communication port functions as a pass through type connection between the one or more diverse computer systems and a management computer when the one or more diverse headless computer systems is in an operational state and the uninterruptable power supply processes the one or more commands to be remotely executed received at the communications port when the one or more diverse headless computer systems are in an inoperable state.

11. A method as recited in claim 1, wherein the one or more unsophisticated out-of-band communication channels comprise a standard serial Universal Asynchronous Receiver/Transmitter.

12. A method as recited in claim 1, wherein the one or more unsophisticated out-of-band communication channels comprises a modem connection.

13. In a management computer system capable of communicating with a plurality of diverse headless computer systems, each comprising at least one sophisticated in-band communication channel for monitoring operation of the corresponding headless computer system and at least one unsophisticated out-of-band communication channel, wherein a sophisticated communication channel is a network type connection and wherein an unsophisticated communication channel is one that is independent of a transport mechanism and one that does not require the corresponding headless computer system or network to be in an operational state, a method of remotely monitoring one or more diverse headless computer systems, over one or more unsophisticated corresponding out-of-band communication channels that allows each of the one or more diverse headless computer systems to be monitored in a similar manner, a computer program product comprising one or more computer readable storage media storing computer executable instruction that implement a method for communicating when a sophisticated in-band communication channel is unavailable due to a hardware or software malfunction at the one or more diverse headless computer systems, the method comprising acts of:

receiving status information over the one or more diverse headless computer systems' corresponding one or more unsophisticated out-of-band communication channels in an extensible, self-describing status format that (i) is independent of the one or more diverse headless computer systems and (ii) separates the status information from physical placement information for displaying the status information;

processing the status information against one or more rules to identify one or more commands to issue in response to the status information;

formatting the one or more commands in an eXtensible Markup Language schema format that is independent of the one or more diverse headless computer systems;

sending the one or more commands to be remotely executed at the one or more diverse headless computer systems using the one or more diverse headless computer systems' corresponding one or more unsophisticated out-of-band communication channels;

formatting a request for the status information in an extensible, self-describing request format that is independent of the one or more diverse headless computer systems; and sending the request to the one or more diverse headless computer systems using the one or more unsophisticated out-of-band communication channels for the one or more diverse headless computer systems.

14. A computer program product as recited in claim 13, wherein the status information is received by a management computer system without having been requested.

15. A computer program product as recited in claim 14, wherein the one or more commands comprise at least one of a restart command, a shut down command, an identification information command, a list processes command, an end process command, a process priority command, a limit memory usage command, a create memory dump command, a view Internet Protocol address command, a set Internet Protocol address command, a view date/time command, a set date/time command, a command to manage an out-of-band communication channel, and a command to access a command shell.

16. A computer program product as recited in claim 15, wherein the one or more rules are part of one or more automated management applications.

17. A computer program product as recited in claim 13, wherein each of the one or more diverse headless computer systems comprises an operating system and a service processor communicating directly with a management computing system over the unsophisticated out-of-band communication channel using the extensible Markup Language schema format and wherein the service processor provides a pass through connection between the management computer and the operating system when the operating system is in an operational state and the service processor is capable of functioning without the operating system when the operating system is in an inoperable state.

18. A computer program product as recited in claim 13, wherein the one or more unsophisticated out-of-band communication channels for the one or more diverse headless computer systems comprise a communication port of an uninterruptable power supply wherein the communication port functions as a pass through type connection between the one or more diverse computer systems and a management computer when the one or more diverse headless computer systems is in an operational state and the uninterruptable power supply processes the one or more commands to be remotely executed received at the communications port when the one or more diverse headless computer systems are in an inoperable state.

19. In a management computer system capable of communicating with a plurality of diverse remote computer systems, each comprising at least one sophisticated in-band communication channel for monitoring operation of the corresponding remote computer system and at least one unsophisticated out-of-band communication channel, wherein a sophisticated communication channel is a network type connection and wherein an unsophisticated communication channel is one that is independent of a transport mechanism and that does not require the corresponding headless computer system or network to be in an operational state, a method of remotely monitoring one or more diverse computer systems, over one or more corresponding unsophisticated out-of-band communication channels that allows each of the one or more diverse computer systems to be monitored in a similar manner, the method comprising steps for:

requesting status information over the one or more diverse computer systems' corresponding one or more unsophisticated out-of-band communication channels using an extensible, self-describing request format that is independent of any particular one of the one or more diverse computer systems and a protocol other than a standard management protocol;

identifying one or more actions to take based on status information that is received from the one or more diverse computer systems in an extensible, self-describing status format that separates presentation information from the received status information; and communicating the identified one or more actions to the one or more diverse computer systems over the one or more diverse computer systems' corresponding one or more unsophisticated out-of-band communication channels in an extensible, self-describing action format that is independent of any particular one of the one or more diverse computer systems.

20. A method as recited in claim 19, wherein the step for identifying one or more actions comprises an act of processing the status information against one or more rules to identify the one or more commands.

21. A method as recited in claim 19, wherein the one or more diverse computer systems' corresponding one or more in-band communication channels are unavailable either because the one or more diverse computer systems are booting or due to a hardware or software malfunction at the one or more diverse computer systems.

22. A method as recited in claim 19, wherein the extensible, self-describing request format, the extensible, self-describing status format, and the extensible, self-describing action format conform to one or more eXtensible Markup Language schemas.

23. A method as recited in claim 19, wherein the one or more actions comprise at least one of a restart command, a shut down command, an identification information command, a list processes command, an end process command, a process priority command, a limit memory usage command, a create memory dump command, a view Internet Protocol address command, a set Internet Protocol address command, a view date/time command, a set date/time command, a command to manage an out-of-band communication channel, and a command to access a command shell.

24. A method as recited in claim 19, wherein the one or more actions are identified by one or more automated management applications.

25. A method as recited in claim 19, wherein the one or more actions are identified by a user through one or more management applications with user interfaces.

26. A method as recited in claim 19, wherein each of the one or more diverse computer systems comprises an operating system and a service processor communicating directly with a management computing system over the unsophisticated out-of-band communication channel using the extensible, self-describing command format and wherein the service processor provides a pass through connection between the management computer and the operating system when the operating system is in an operational state and the service processor is capable of functioning without the operating system when the operating system is in an inoperable state.

27. A method as recited in claim 19, wherein the one or more unsophisticated out-of-band communication channels for the one or more diverse computer systems comprise a communication port of an uninterruptable power supply wherein the communication port functions as a pass through type connection between the one or more diverse computer systems and a management computer when the one or more diverse headless computer systems is in an operational state and the uninterruptable power supply processes the one or more commands to be remotely executed received at the communications port when the one or more diverse headless computer systems are in an inoperable state.

28. A method as recited in claim 19, wherein the one or more diverse computer systems comprise one or more headless computer systems.

29. A computer program product comprising one or more computer readable storage media storing computer executable instructions that implement the method recited in claim 19.

30. A computer program product as recited in claim 29, wherein the one or more actions are identified by one or more automated management applications.

31. A computer program product as recited in claim 29, wherein the step for communicating the identified one or more actions to the one or more diverse computer systems comprises acts of:
formatting the one or more actions in the extensible, self-describing action format; and
sending the one or more actions to the one or more diverse computer systems using the one or more diverse computer systems' corresponding unsophisticated out-of-band communication channel.

32. A computer program product as recited in claim 29, wherein the one or more diverse computer systems' corresponding one or more in-band communication channels are unavailable because the one or more diverse computer systems are booting.

33. A computer program product as recited in claim 29, wherein the one or more diverse computer systems' corresponding one or more in-band communication channels are unavailable due to a hardware or software malfunction at the one or more diverse computer systems.

34. A computer program product as recited in claim 29, wherein the extensible, self-describing request format, the extensible, self-describing status format, and the extensible, self-describing action format conform to one or more eXtensible Markup Language schemas.

35. A computer program product as recited in claim 29, wherein the one or more actions comprise at least one of a restart command, a shut down command, an identification information command, a list processes command, an end process command, a process priority command, a limit memory usage command, a create memory dump command, a view Internet Protocol address command, a set Internet Protocol address command, a view date/time command, a set date/time command, a command to manage an out-of-band communication channel, and a command to access a command shell.

36. A computer program product as recited in claim 29, wherein output for one or more components at the one or more diverse computer systems is redirected to a management computer, and wherein the one or more components comprise at least one of a setup loader component, a setup component, a recovery component, a remote installation component, an operating system loader component, and a stop error message component.

37. A computer program product as recited in claim 29, wherein each of the one or more diverse computer systems comprises an operating system and a service processor communicating directly with a management computing system over the unsophisticated out-of-band communication channel using the extensible, self-describing command format and wherein the service processor provides a pass through connection between the management computer and the operating system when the operating system is in an operational state and the service processor is capable of functioning without the operating system when the operating system is in an inoperable state.

38. A computer program product as recited in claim 29, wherein the one or more unsophisticated out-of-band communication channels for the one or more diverse computer systems comprise a communication port of an uninterruptable power supply wherein the communication port functions as a pass through type connection between the one or more diverse computer systems and a management computer when the one or more diverse headless computer systems is in an operational state and the uninterruptable power supply processes the one or more commands to be remotely executed received at the communications port when the one or more diverse headless computer systems are in an inoperable state.

* * * * *